Feb. 4, 1969    F. R. FLEISCHMAN ET AL    3,425,339
VENDING APPARATUS FOR DISPENSING RECONSTITUTED
FOOD IN CONTAINERS
Filed March 1, 1965

INVENTORS
FREDERICK R. FLEISCHMAN
GEORGE A. RUTLEDGE

BY *Glenn, Palmer*
*& Matthews*

THEIR ATTORNEYS

United States Patent Office 3,425,339
Patented Feb. 4, 1969

3,425,339
VENDING APPARATUS FOR DISPENSING RECONSTITUTED FOOD IN CONTAINERS
Frederick R. Fleischman, Powhatan, Va., and George A. Rutledge, Pelham, N.Y., assignors to Reynolds Metals Company, Richmond, Va., a corporation of Delaware
Filed Mar. 1, 1965, Ser. No. 436,074
U.S. Cl. 99—357                                   4 Claims
Int. Cl. A23l 3/10, 3/34

ABSTRACT OF THE DISCLOSURE

A vending apparatus having tapering probe means for puncturing into a sealed container of freeze-dry food to inject steam therein to reconstitute the food before the container is dispensed out of a dispensing opening of the apparatus, the probe means initially puncturing into the container a predetermined amount and then being partially retracted to form vent means around the probe for venting the steam being injected into the container.

---

This invention relates to an improved vending apparatus wherein freeze-dry food products and the like can be automatically and rapidly reconstituted for subsequent dispensing to the ultimate consumer.

This invention also relates to an improved method of performing the food reconstituting operation.

In particular, this invention provides an apparatus wherein a freeze-dry food product is disposed in a container and is maintained in the freeze-dry condition in the apparatus until the operator activates the apparatus by a coin or the like to cause the container to be dispensed to a first station in the apparatus where the freeze-dry food product is completely reconstituted in the container whereby means, thereafter, dispenses the container to a dispensing opening of the apparatus so that the ultimate consumer can open the container in a conventional manner by either easy open means on the container or by auxiliary opening means. Thus, a fully automatic vending process and method is provided by this invention.

In the past, vending systems involving conventionally frozen and refrigerated foods result in sacrifice or both costly product and/or severe quality loss since the heating cycle therefor must begin long before service periods. This results in quality loss through (1) holding food at serving temperatures for long periods of time, such as up to four hours, (2) in some instances recycling the food back to its original frozen or refrigerated condition for heating at a later time whereby severe food degradation usually results from such practice. This prior known system often leads to actual destruction, discard and total loss of the food whereby in any event, both low quality and/or loss of the food represent a serious economic problem to many vending operators.

Another prior known system utilizing frozen or refrigerated foodstuffs provides an apparatus wherein the food containers are held in an automatic dispensing unit in either a frozen or refrigerated condition. After removal from the first apparatus by an operator or consumer, the frozen or refrigerated food stuffs must be transferred to a relatively fast reheating device, such as high frequency microwave type ovens, for reconstitution thereof. Although this system is generally more costly to operate, it does provide more consistently higher quality foods. The principal disadvantage from this system, however, is an inconvenience inconsistent with the public's conception of truly automatically vended product as the consumer must perform manual operations.

However, according to the teachings of this invention, food products, such as au gratin potatoes, beef stew and the like can be frozen, and, while in the frozen condition be subject to a vacuum to drive off all of the moisture thereof whereby a freeze-dry substantially dehydrated food product remains which can be sealed in metallic containers. The thus formed freeze-dry product can be maintained at any desired temperature in the containers without product or flavor loss whereby such containers can be stored in a vending apparatus or the like to be reconstituted in the manner previously and hereinafter described.

Therefore, it can be seen that the apparatus and method of this invention provides a truly automatic operation for quickly vending food even though the same is originally maintained in a freeze-dry condition.

Accordingly, it is an object of this invention to provide an improved vending apparatus or the like having one or more of the novel features set forth above or hereinafter shown or described.

Another object of this invention is to provide an improved method for dispensing such a product or the like, the method of this invention having one or more of the novel features set forth above or hereinafter shown or described.

Other objects, uses and advantages of this invention are apparent from a reading of this description which proceeds with reference to the accompanying drawings forming a part thereof and wherein.

Figure 1:
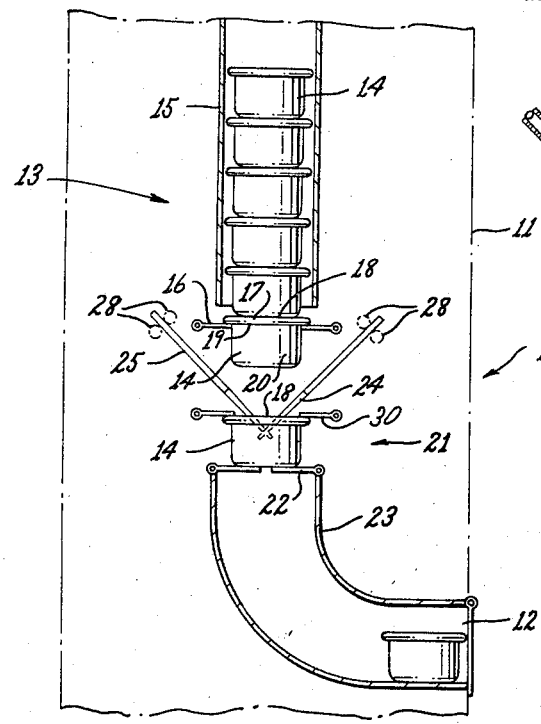
FIGURE 1 is a schematic view illustrating the improved apparatus and method of this invention.

While the various features of this invention are hereinafter described and illustrated as being particularly adaptable for reconstituting freeze-dry food products or the like, it is to be understood that the various features of this invention can be utilized singly or in any combination thereof to provide reconstituting means for other types of products or the like.

Therefore, this invention is not to be limited to only the embodiment illustrated in the drawings, because the drawings are merely utilized to illustrate one of the wide variety of uses of this invention.

Referring now to FIGURE 1, an improved vending apparatus of this invention is generally indicated by the reference numeral 10 and comprises a frame structure or outer casing 11 having a conventional dispensing opening 12 therein through which the ultimate consumer or operator can receive the vended product after initiating operation of the apparatus 10 by depositing a coin therein or the like.

The apparatus 10 is divided into a first station 13 wherein a plurality of containers 14 are maintained in stacked relation in a chute means 15 with the bottom container 14 in the chute means 15 being held from falling by gravity by a pair of pivotally mounted arms 16 disposed under the rim 17 of the bottom container 14 and being formed by a cover member 18 being curled with an an upper flange 19 of a cup-shaped body member 20. The first station 13 could include a refrigerant coil or other suitable means to maintain the containers 14 in the first station 13 at a desired temperature. However, should the containers 14 contain a freeze-dry food product, such refrigerant means need not be utilized, if desired.

When the operator or ultimate consumer activates the apparatus 10 in any suitable manner to effect the dispensing of product thereof, the arms 16 momentarily pivot downwardly to release the bottom container 14 in the chute 15 so that the same can fall to a second station 21 and come to rest on a pair of pivotally mounted arms 22 forming the inlet for a dispensing chute 23 leading to the dispensing opening 12 of the apparatus 10. As the bottom container in the chute 15 falls to the station 21, the arms 16 move back to the position illustrated in FIGURE 1 to arrest the movement of the remaining containers 14 in the chute 15 in the manner illustrated in FIGURE 1.

Figure 2:
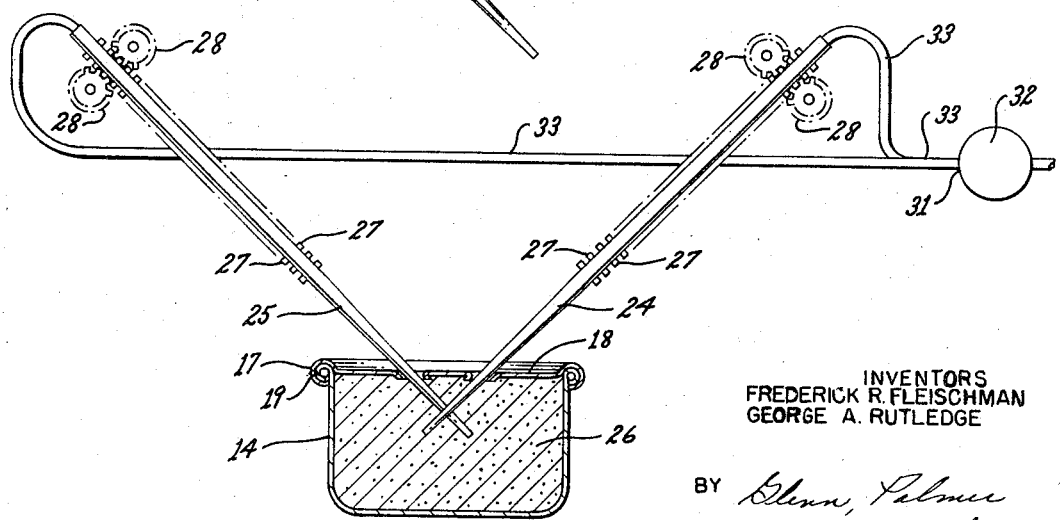
FIGURE 2 is an enlarged, fragmentary, cross-sectional view illustrating the product reconstituting portion of the apparatus of FIGURE 1.

With a container 14 now disposed on the arms 22 at the station 21, a plurality of pin-like probe means 24 and 25 are moved downwardly toward the top 18 of container 14 to puncture into the same in the manner illustrated in FIGURE 2 so as to be received into the freeze-dry food product 26.

Figure 3:
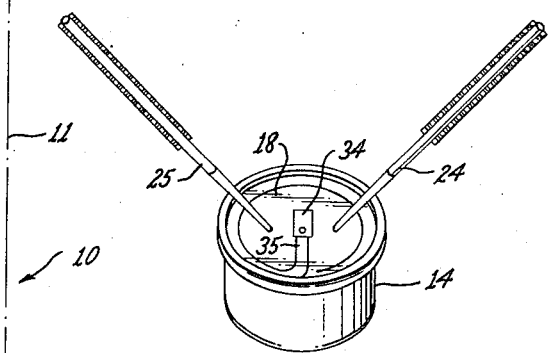
FIGURE 3 is a fragmentary perspective view of the structure illustrated in FIGURE 2.

While the probe means 24 and 25 can be indexed in any suitable manner, one embodiment thereof is to provide opposed gear racks 27 thereon which are disposed in meshing relation with gear wheels 28 which when rotated in the proper direction, will force the probe means 24 and 25 toward the container 14 to puncture the container top in the manner illustrated in FIGURES 2 and 3.

Figure 5:
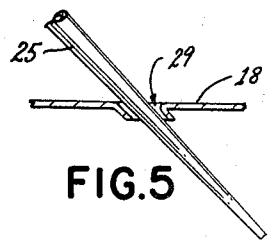
FIGURE 5 is a view similar to FIGURE 4 and illustrates the puncture probe backed out to provide venting means for the container.
Figure 4:
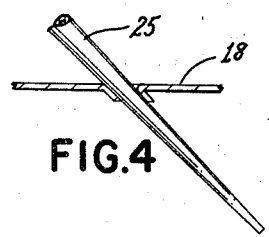
FIGURE 4 is a fragmentary cross-sectional view illustrating the initial container puncturing operation.

The probe means 24 and 25 have tapering ends that puncture into the top 18 of the container 14 disposed at the station 21 in the manner illustrated in FIGURE 4. However, after the probe means 24 and 25 have punctured the top 18 in the manner illustrated in FIGURE 4, the gear wheels 28 back the probe means 24 and 25 slightly outwardly in the manner illustrated in FIGURE 5 whereby the tapering construction of the probe means 24 and 25 provide vent openings 29 around the probe means 24 and 25 for a purpose hereinafter described. In order to permit the probe means 24 and 25 to be backed off in the manner illustrated in FIGURE 5, suitable abutment means 30 are swung against the top 18 of the container 14 at the station 21 to hold the container 14 on the arms 22 during the back-up operation of the probe means 24 and 25.

The probe means 24 and 25 have the hollow interiors thereof interconnected to the outlet side 31 of a superheated steam generating means 32 by conduit means 33 whereby superheated steam can be injected into substantially the center portion of the freeze-dry product 26 in the container 14 at the station 21 to rapidly reconsitute or rehydrate the food 26 therein to provide the same at a proper dispensing condition, the openings 29 around the probe means 24 and 25 permitting the steam to be vented from the container 14 during the reconstituting operation.

After the food 26 in the container 14 has been reconstituted to the proper condition, the probe means 24 and 25 are indexed outwardly while abutment means 30 hold the container 14 so that the probe means 24 and 25 can be removed therefrom.

Thereafter, the arms 22 are pivoted downwardly so that the heated container 14 can drop through the dispensing chute 23 to the dispensing opening 12 in the apparatus 10. Thus, the ultimate consumer or operator can take the container 14 at the opening 12 of the apparatus 10 and open the same with a conventional opener means or the like to dispense the reconstituted food product 26 therefrom.

While the containers 14 of this invention can be formed of any suitable material in any suitable manner, the containers 14 illustrated in the drawings are formed of aluminum-containing metallic material or the like which is readily puncturable by the probe means 24 and 25. Further, the top 18 of the container 14 can have an easy open means as illustrated in FIGURE 3 whereby the consumer can grasp the pull tab 34 and pull the tear strip 35 to completely open the top 18 of the container 14.

While the probe means 24 and 25 are illustrated in the drawings as being relatively large in diameter, the same are merely set forth for purposes of illustration as the probe means 24 and 25 can have relatively small diameters so that the holes subsequently punctured in the containers 14 will be relatively small.

Therefore, it can be seen that this invention not only provides an improved automatic dispensing apparatus wherein a food product can be maintained in a container in a freeze-dry condition and, thereafter, be automatically reconstituted when desired to provide a food product for subsequent consumption thereof in a truly automatic manner, but also, this invention provides an improved method of reconstituting food or the like.

While the form of the invention now preferred has been disclosed as required by the statutes, other forms may be used, all coming within the scope of the claims which follow.

What is claimed is:

1. In a vending apparatus having a dispensing opening therein, the improvement comprising a sealed container of freeze-dry food, means to maintain said container at a first station, means to dispense said container from said first station to a second station, tapering probe means for puncturing into said container at said second station to inject steam therein for reconstituting said food in said container, means for moving said probe means to puncture into said container at said second station a predetermined amount to form opening means therein, means for partially retracting said probe means from said container a predetermined amount so that said opening means provides venting means around said tapering probe means too vent said injected steam, means to fully retract said probe means from said container after said food therein has been reconstituted, and means for dispensing said container from said second station to said dispensing opening after said food has been reconstituted therein.

2. In a vending apparatus as set forth in claim 1, said container being formed of aluminum to be readily punctured by said probe means.

3. In a vending apparatus as set forth in claim 1, said steam being superheated.

4. In a vending apparatus as set forth in claim 1, said probe means comprising two separate probes each functioning in the same manner, said probes puncturing into said top wall of said container in angular relation so as to cross each other inside said container.

References Cited

UNITED STATES PATENTS 3,139,343  6/1964  Baselt _____ 99—1 X
3,228,776  1/1966  Savage et al.

HYMAN LORD, Primary Examiner.

U.S. Cl. X.R.
99—171, 182